J. N. JOHNSON.
SELF LEVELING REPEATING CAMERA.
APPLICATION FILED DEC. 3, 1912.

1,103,418.

Patented July 14, 1914.
4 SHEETS—SHEET 2.

Inventor
John N. Johnson

Witnesses
By Rosenbaum & Stockbridge
Attorneys

J. N. JOHNSON.
SELF LEVELING REPEATING CAMERA.
APPLICATION FILED DEC. 3, 1912.

1,103,418.

Patented July 14, 1914.
4 SHEETS—SHEET 3.

J. N. JOHNSON.
SELF LEVELING REPEATING CAMERA.
APPLICATION FILED DEC. 3, 1912.

1,103,418.  
Patented July 14, 1914.  
4 SHEETS—SHEET 4.

Inventor  
John N. Johnson

Witnesses

By Rosenbaum & Stockbridge  
Attorneys

UNITED STATES PATENT OFFICE.

JOHN N. JOHNSON, OF ALBUQUERQUE, NEW MEXICO.

SELF-LEVELING REPEATING CAMERA.

1,103,418.  Specification of Letters Patent.  Patented July 14, 1914.

Application filed December 3, 1912. Serial No. 734,657.

*To all whom it may concern:*

Be it known that I, JOHN N. JOHNSON, a citizen of the United States, residing at Albuquerque, in the county of Bernalillo and State of New Mexico, have invented certain new and useful Improvements in Self-Leveling Repeating Cameras, of which the following is a full, clear, and exact description.

This invention relates to improvements in repeating cameras, or in cameras which may be quickly and accurately sighted, and in which a number of successive snap shots may be taken, particularly of objects in motion, by the use of but one hand.

Among the objects of this invention are: to generally improve the construction and arrangement of the working parts of cameras of this nature whereby a more accurate, direct, and easily running mechanism is produced; to provide a camera with an improved hand grasp or support, and a connection between the camera and the support whereby the camera will automatically adjust itself by gravity into a true horizontal position beneath the hand grasp; to provide a novel trip or actuating device for the camera operable from the hand grasp whereby the hand supporting the camera may actuate the trip and make an exposure of the sensitized film, and to then immediately advance the film for a succeeding exposure; and to provide an improved interlocking means between the shutter operating mechanism and the film advancing mechanism whereby an exposure of the film is prevented until the previously exposed portion of the film is completely covered so that double exposure of any portion of the sensitized film strip is positively prevented.

The above, and various other objects and advantages of this invention, are provided in the general arrangement of the mechanism of this novel camera, and are brought out to advantage in the following detail description of the embodiment of this invention shown, for the purpose of illustration, in the accompanying drawings.

In the accompanying drawings.

Referring to the drawings, in which like parts are designated by similar characters of reference throughout the several views, 10 designates the box of a folding camera, 11 the bellows, and 12 the usual shutter mechanism. It is, of course, understood that this invention may be applied to cameras of various kinds, and is disclosed in connection with this type of camera merely for purposes of illustration and description.

The box 10 is provided on its top and at its central portion with a sleeve socket 13 open at its upper end and provided at its lower end with a base 14 adapted for securement to the top of the box 10 by rivets or the like. The sleeve 13 is open at its upper end, and is provided at its opposite sides with a pair of bayonet slots 15 opening through the upper edge of the socket.

A hollow neck or stud 16 fits snugly into the socket 13 and is provided with a pair of radially extending and oppositely disposed pins 17, 17' received in the bayonet slots. Preferably one of the pins 17' is threaded and is provided with a winged nut 18 adapted to be screwed up on the stud 17' against the outer face of the socket 13 to bind the neck 16 within the socket. This neck 16 is provided with a T-head 16', the branches of which are of cylindrical form and provided in their outer faces with annular race-ways receiving therein a number of ball-bearings 19 held in the race-ways by a T-casing 20 carried upon the lower end of a handle 21. The casing 20 is so mounted upon the T-head of the neck 16, and has an opening in its lower side through which projects the stud or stem of the neck 16, as to admit of a certain free play or swinging movement of the neck in the casing 20. The handle 21 is hollow and is slightly bulged or enlarged intermediate its ends whereby to conform to the hand of the operator. The handle 21 supports upon its upper end a head 22. The head 22 is hollow, communicates with the handle 21, is adapted to rest in a substantially horizontal plane when the camera is in use, and is provided with sights 23 at its opposite ends adapted to be alined with the object a picture of which is to be taken.

The head 22 is provided with a rack bar 24 movable longitudinally in the head and having a depending trigger or finger piece 25 projecting through a longitudinal slot 26 provided in the underside and at the forward end of the head.

The rack bar 24 is held in a normally forward position by a spring 27, having one end fixed to the interior forward end of the head and having its opposite end secured to the rear end of the rack bar. The trigger 25 preferably depends from the forward end of the rack bar so as to space the trigger considerably from the handle 21 and provide ample space for a full stroke of the rack bar. The rack bar 24 meshes with a pinion 28 fixed upon the upper end of a shaft 29 extending from the head 22 down through the handle 21 into casing 20, and having connection by a universal joint 30 with a lower shaft section 31 positioned in the neck 16. The section 31 is provided with a socket member 32 upon its lower end interfitting with a corresponding socket member 33 carried upon the upper end of a spindle 34 journaled in the box 10 and projecting up into the socket 13.

Figures 8, 9, 10, 11:
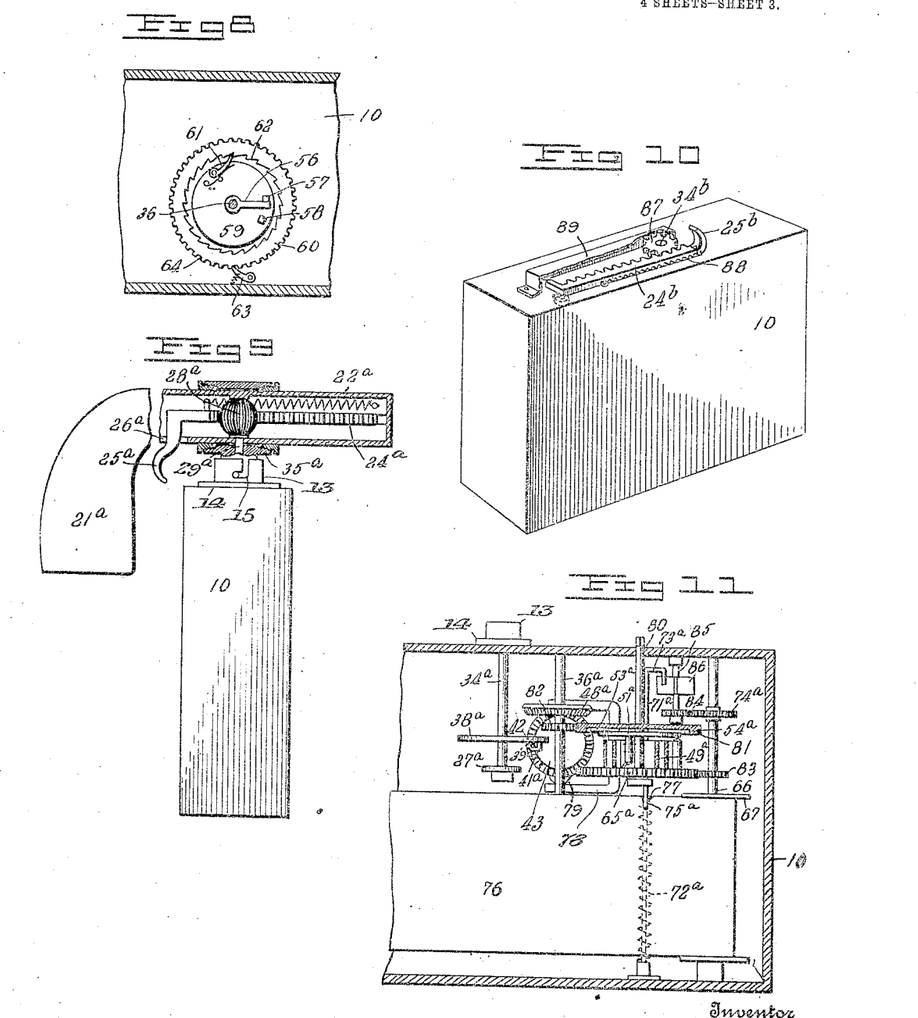
Fig. 8 is a detail view in section on the line 8—8 of Fig. 5 showing the film advancing mechanism.
Fig. 9 is a side elevation partly in section of the improved camera, showing a slight modification in the connecting and trip devices.
Fig. 10 is a perspective view of the camera showing a further modified form of the trip device.
Fig. 11 is a transverse section taken through the camera box showing a modified form of operating mechanism.

Another embodiment of this feature of the invention is disclosed in Fig. 9 wherein the shaft 29ᵃ is provided upon its upper end with a pinion 28ᵃ of spherical form mounted upon a loose bearing 35ᵃ carried in the lower side of the head 22ᵃ. In this modification the head 22ᵃ is given the form of a pistol wherein the handle 21ᵃ is curved downwardly from the inner end of the head 22ᵃ and constitutes a suitable hand grasp. The rack bar 24ᵃ has the rigger 25ᵃ upon its rear end, the trigger depending through the slot 26ᵃ formed in the underside and at the rear end of the head 22ᵃ. The trigger 25ᵃ is thus in position to be readily grasped by the finger of the hand upon the handle 21ᵃ. The loose bearing 35ᵃ admits of the angular adjustment of the head 22ᵃ upon the upper end of the shaft 29ᵃ, and insures the correct positioning of the box 10 which swings beneath the head 22ᵃ.

The spindle 34 is journaled vertically within the box 10 at its middle portion and is provided with a gear 35 upon its lower end. A second spindle or shaft 36 is journaled vertically within the box 10 and is spaced laterally a short distance from the spindle 34, and has positive connection with the spindle 34 by a gear 37 meshing with the gear 35. The second spindle 36 is provided intermediate its end with a flat disk 38 provided with a pair of spaced slots 39 and 40 extending inwardly from the edge of the disk and being located at one side of the diameter of the disk. Overhanging the slot 39 is a lip 41 offset upwardly from the disk and adapted to receive and to normally hold a pin 42 projecting from a vertically disposed pinion 43. The slots 39 and 40 are so positioned in the disk 38 as to receive the pin 42 when turned into its offset positions as disclosed in full and in dotted lines in Fig. 7 and to admit of the passage of the pin through the disk 38 at certain predetermined intervals as heretofore set forth. The pinion 43 is mounted within the box 10 against the front side thereof and has universal connection with an extensible shaft 44 extending forwardly from the box 10 to the shutter 12. The shaft 44 is made up of a plurality of telescoping sections united by pin and slot connection so that the sections turn in unison and may be extended to any desired position. The forward end of the shaft 44 has a universal joint 45 connecting the shaft 44 with a segment 46 intermeshing with a segment arm 47 projecting from the shutter mechanism 12. It is thus seen that a partial turn of the pinion 43 swings the segment 46 through a corresponding distance and thereby depresses or raises the shutter arm 47. The pinion 43 is beveled and meshes with a large beveled gear 48 controlled by a spring 49 for turning in one direction and adapted to impart movement to the pinion 43. The spindle 36 is provided upon its upper end with a radially extending arm 50 projecting outwardly beneath a disk 51 loose upon the upper end of the spindle 36 and preferably located within a recess in the underside of the gear 48. The disk 51 fits loosely within the gear 48 and is provided with a shoulder 52 depending in the path of the arm 50 whereby upon the rotation of the arm 50 the disk 51 is carried therewith. The spring 49 has one end fixed to the casing 10 while its opposite end, which is coiled about the spindle 36, is fixed to a sleeve carried by the disk 51. The disk 51 is thus yieldingly held in a certain position by the spring 49. A pawl 53 is carried upon the disk 51 and engages an internal ratchet 54 formed within the gear 48. The pawl 53 is so positioned with respect to the ratchet 54 that the swinging of the arm 50 in its initial or forward movement carries the disk 51 independently of the gear 48 whereby the spring 49 is wound. Upon the return movement of the arm 50 away from the shoulder 52 the pawl 53 engages the ratchet 54 and holds the disk 51 from movement and under the tension of the spring 49. In this position the pin 42 of the pinion 43 bears against the disk 38 and holds the gear 48 from turning. A stop 55 is mounted in the box 10 and lies in the path of the arm 50, the arm 50 normally resting against the stop when the device is in normal inoperative position. The stop 55 limits the reverse movement of the arm 50 and the spindle 36.

The lower end of the spindle 36 is provided with a second radially extending arm 56 movable between a pair of spaced stops or shoulders 57 and 58 upstanding from the upper face of a disk 59 rotatable upon the lower end of the spindle 36. About the disk 59 is gear 60 movable with the disk 59 in one direction by means of a pawl 61 upon the disk 59 and an internal ratchet 62 upon the gear 60. The gear 60 is adapted for intermittent movement in one direction only, and is held from movement in a reverse direction by means of a pawl 63 carried within the box 10 and engaging an external ratchet 64 upon the gear 60. The stops or shoulders 57 and 58 are spaced apart upon the disk 59 a distance sufficient to allow a free movement of the arm 56 with the spindle 36 and the disk 38 to free the pin 42 and admit of the operation of the pinion 43, whereby to actuate the shutter snapping mechanism. The gear 60 is connected by a train of gears 65 to the film spool shaft 66 for winding up the sensitized film. The film shaft 66 comprises a length of hollow tubing having one of the gears 65 fixed thereon and having connection with the film spool 67 through a clutch 68 operable by a rod 69 extending up through the box 10. The rod 69 has a winged nut or finger piece 70 upon its upper end of usual construction whereby to operate the clutch 68. The clutch 68 is provided for the purpose of freeing the film spool 67 when it is desired to replace the film strip in or remove the film strip from the camera.

The camera is provided with a latch lever 71 movable vertically within the box 10 under the tension of a spring 72, the latter yieldingly holding the latch lever 71 down. The latch lever 71 is provided with a tooth 73 extending laterally therefrom and adapted for normal engagement with a ratchet 74 fixed upon the shaft 66 and adapted to hold the shaft 66 normally from rotation. The latch lever 71 is provided with a hook 75 toward its lower end which engages over the upper edge of the sensitized film 76 and is adapted to drop into notches 77 formed in the upper edge of the film 76 at predetermined intervals. The notches 77 are formed at the opposite ends of each section of the film which is to be exposed, the dropping of the hook 75 into the notches 77 determining the movement of the film and also regulating the length of the sensitized film which is to be exposed. The upper end of the latch lever 71 is provided with a fork 78 engaging over the pinion 43 and having its arms spaced apart a distance slightly greater than the diameter of the pinion 43. A cam block 79 is carried upon one side of the pinion 43 and normally rests against the lower arm of the fork 78 whereby to lock the lever 71 in a lowered position. The cam block 79 is adapted to be turned up with the pinion 43 and to engage against the upper arm of the fork 78 and raise the latter against the tension of the spring 72 whereby to lift the hook 75 out of the notch 77 and release the film 76.

Figure 7:
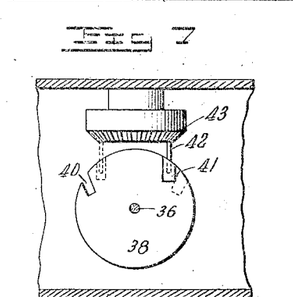
Fig. 7 is a similar section, but looking down upon the escapement or trip device holding the shutter operating mechanism inoperative and showing in dotted lines the mechanism released.
Figure 12:
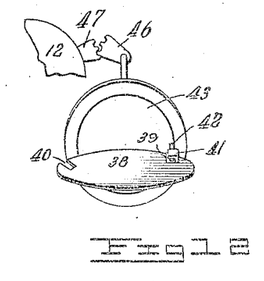
Figs. 12, 13, 14 and 15 disclose conventionally the escapement or trip device in the various positions which it assumes during the operation of the camera mechanism, and showing the corresponding positions of the shutter snapping arms.
Figure 13:
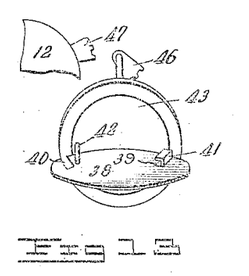

The operation of the camera is as follows: The operator grasps the handle 21 and places a finger, preferably the fore-finger, upon the trigger 25. The operator now levels the head 22 with the object to be photographed using the sights 23. The position of the head 22 now being determined the box 10 of the camera swings upon the T-head of the neck 16 into a substantially horizontal position whereby the body of the camera is in a true position to take a picture of the object sighted. The trigger 25 is now drawn toward the handle 21 whereupon the rack 24 moves backwardly within the head 22 and rotates the pinion 28. The shaft 29 is thus turned and, through the shaft section 31 and clutch members 32 and 33, rotates the spindle 34. The initial slight rotation of the spindle 34 correspondingly turns the second spindle 36 by the gears 35 and 37, and revolves the disk 38 a sufficient distance from its normal position as shown in Figs. 7 and 12, to free the pin 42 from the lip 41. When the disk 38 is in normal position the pinion 43 is held from turning by the pin 42 and the segment 46 lightly touches the shutter arm 47 and is in position to depress the same upon the further movement of the pinion 43. When the pin 42 is freed, as just described, the spring 49 turns the gear 48 and, by means of the pawl 53, rotates the pinion 43 until the pin 42 comes into contact with the upper face of the disk 38, when the pinion 43 is stopped as shown in Fig. 13. During this partial revolution of the pinion 43 the segment 46 engages and depresses and then releases the shutter arm 47, the latter automatically returning to its normal raised position, as shown to advantage in Fig. 13. The shutter has thus been opened and closed and the exposure of the section of the film has taken place.

Figures 1, 2, 3:
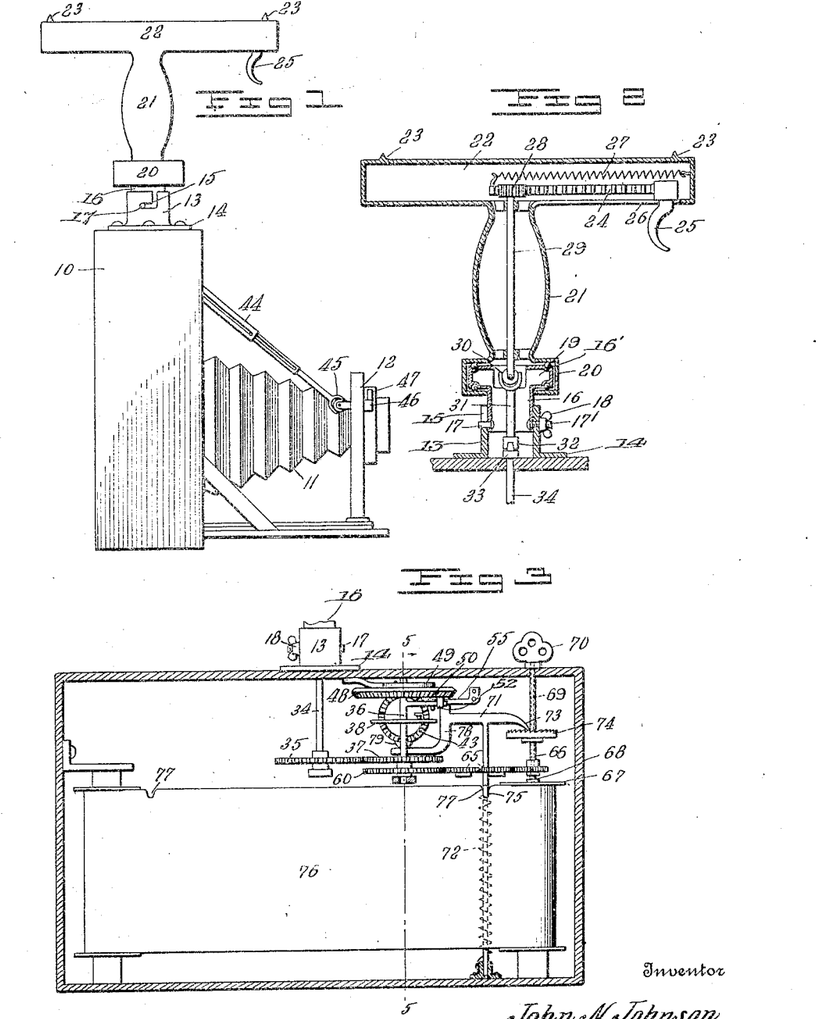
Figure 1 is a side elevation of a bellows or extensible camera embodying the improvements of this invention.
Fig. 2 is a detail enlarged longitudinal section through the supporting and trip devices.
Fig. 3 is an enlarged detail transverse-section through the box of the camera showing the film and shutter operating mechanisms.
Figure 4:
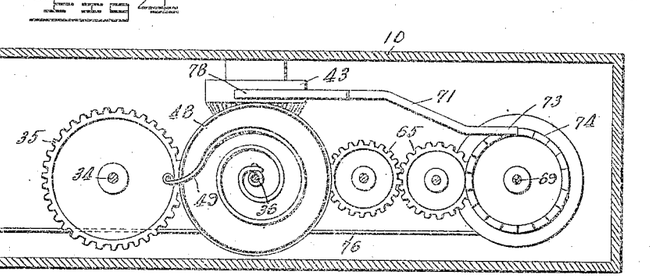
Fig. 4 is a top plan view of the camera box and mechanism therein, having the top plate removed.
Figure 5:
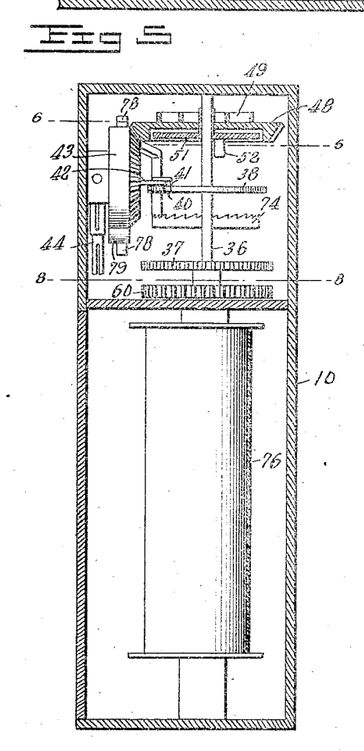
Fig. 5 is a vertical longitudinal section through the camera box on the line 5—5 of Fig. 3 looking in the direction of the arrows.
Figure 6:
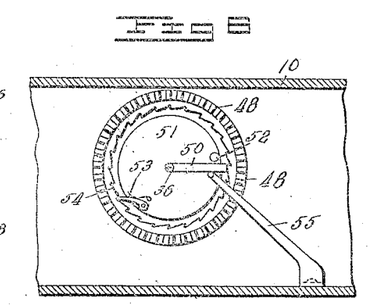
Fig. 6 is a detail in section on the line 6—6 of Fig. 5, showing the underside of the shutter operating mechanism.

The initial turning of the pinion 43, upon the release of the pin 42, raises the cam block 79 shown in Figs. 3 and 5, to the upper side of the pinion and against the upper arm of the fork 78. This movement of the block 79 raises the latch lever 71 and disengages the hook 75 of the latch lever from the notch 77 of the film 76. The pinion 43 is held in this position until the disk 38 moves sufficiently to release the pin 42 through the slot 40. In the meantime, the arm 56 moves sufficiently to rotate the film spool shaft 66 and the spool 67 to wind up a predetermined length of the film 76, such as has just been exposed.

Figure 14:
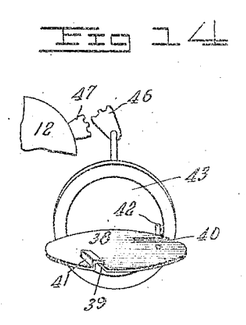
Figure 15:
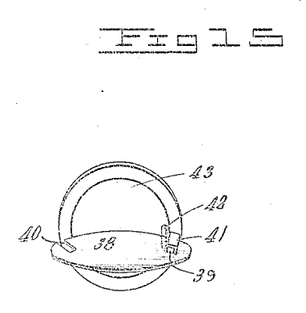

Referring particularly to Fig. 8, as the disk 38 passes through this latter partial revolution the arm 56 on the shaft 36 which arm is freely movable between the stops 57 and 58 during the initial movement of the disk 38 and shaft 36 strikes the stop 58 and rotates the disk 59 with the arm 56. The turning of the disk 59 moves the pawl 61 against the internal ratchet teeth of the gear 60, and causes the gear 60 to turn with the disk 59. As soon as the gear 60 is turned it sets in motion the train of gears 65 which revolves the film spool shaft 66. Continuing the pull upon the trigger 25, and the consequent turning of the disk 38, the slot 40 is brought into register beneath the pin 42, as shown in dotted lines in Fig. 7, and the pinion 43 is again released. The spring 49 now turns the pinion 43 until the pin 42 strikes the underside of the disk 38 and the segment 46 is about to touch the shutter snapping arm 47 which position is disclosed in Fig. 14. As shown in this figure, the pin 42 cannot pass through the slot 40 and rise when the disk 38 turns to bring the slot 40 over the pin 42 since the slot 40 is formed in the disk at the angle shown. This second turning of the pinion moves the block away from the upper arm of the fork 78 and into a position near the lower arm of the fork but not engaging the same. The latch lever 71 however cannot fall until the next notch 77 in the film strip 76 comes beneath the hook 75. As the disk 38 continues to turn from the position shown in Fig. 14 into the position disclosed in Fig. 15, the trigger 25 completes its backward stroke and the disk 38 nearly completes a single revolution. The disk 38 is not given a complete turn since it is desired to hold the pinion 43 from further movement and to prevent the segment 46 striking and operating the shutter snapping arm 47. During this last stage of the turning movement of the disk 38 the film strip 76 is drawn across the interior of the box 10 until the desired new section of the strip is in position to be exposed. As soon as the disk 38 completes its turning movement as shown in Fig. 15, the hook 75, Fig. 3, drops into the next notch 77 of the film strip, releases the latch lever 71 and locks the film spool and the film from further turning. The trigger 25 is now released when the spring 27 draws the rack bar 24 into the forward end of the head 22 and rotates the spindles 34 and 36 in a reverse direction into their normal positions. Upon the reverse movement of the spindle 36 the arm 56 is turned back into engagement with the stop 57 whereby to rotate the disk 59 back into normal position. This reverse movement of the disk 59 moves the pawl 51 freely over the internal ratchet 62 of the gear 60, while the gear 60 is held from returning by the pawl 63 mounted in the box 10. Thus the film strip 67 is held wound. The reverse movement of the arm 50 carries the same away from the shoulder 52 and allows the disk 51 to remain under the tension of the spring 49 and in position for operating the pinion 43 upon the next movement of the trigger 25. As the arm 50 is returned to normal position against the stop 55 the disk 38 is returned throughout its almost complete turn to bring the slot 39 into register with the pin 42, whereupon the pin 42 moves through the slot 39 and snaps up against the lip 41. The mechanism is now in normal inoperative position and is ready to expose a second length of the film strip and to immediately wind the same upon the spool 67.

The disclosure of this invention so far is but one embodiment of the same, and it is understood that various other structures and arrangements of parts may be had within the spirit of this invention. For instance, where it is desired to provide an automatic operating means for the camera in place of depending upon the rack bar 34 to perform the function of turning the shaft 36 when released the following arrangement may be had and is considered as a modification of the above embodiment of the invention and is disclosed in Fig. 11.

The spindle 34$^a$ within the casing or box 10 is provided intermediate its ends with a disk 38$^a$ having a slot 39$^a$ in one edge and a downwardly offset lip 41$^a$. A coil spring 27$^a$ is wound about the lower end of the spindle 34$^a$ having one end attached thereto and having its opposite end attached to the box 10. The spring 27$^a$ is adapted to yieldingly hold the spindle 34$^a$ in a certain predetermined position, such as disclosed in Fig. 11. The pin 42 of the gear 43 rests upon the member 41ª and is released therefrom by the movement of the disk 38ª in a direction to carry the rest 41ª from the pin 42. A second spindle 36ª is mounted in the casing 10 in spaced relation from the spindle 34ª and carries a beveled gear 48ª near its upper end which meshes with the pinion 43. A mainshaft 80 is journaled in the box 10 in spaced relation from the second spindle 36ª and is provided upon its lower end with a gear wheel 65ª and a coil spring 49ª resting upon the gear wheel 65ª and having its outer end attached to the gear wheel 65ª. The inner end of the spring 49ª is attached to the main shaft 80. The shaft 80 is provided with a disk 51ª fixed upon the shaft and having at one edge a pawl 53ª engaging the teeth of an internal ratchet 54ª of a driving gear 81. The driving gear 81 meshes with a pinion 82 fixed upon the second spindle 36ª whereby to impart rotation to the spindle 36ª when the pin 42 is released from the rest 41ª. The gear wheel 65ª meshes with a pinion 83 fixed upon the film spool shaft 66 whereby to rotate the spool 67 and wind the film 76 thereon. The shaft 66 is provided with a gear wheel 74ª meshing with a small pinion 84 upon the lower end of a flier shaft 85 mounted in a box 10. The flier shaft 85 is provided with a fan 86, the vanes of which are adapted to regulate the speed of rotation of the shaft 66.

The mechanism is also provided with a latch lever 71ª movable vertically within the box 10 and yieldingly held down by a spring 72ª. The latch lever has a hook 75ª engaging over the upper edge of the film strip 76 and adapted to drop into the notches 77 in the film strip to determine the lengths of the strip to be exposed. The upper end of the latch lever 71ª is provided with a tooth or finger 73ª engaging the vanes or blades of the fan 86 to normally hold the spool winding operating mechanism inoperative. The shaft 80 is formed upon its upper end for the reception of a key or the like whereby the spring 49ª may be manually wound. In this modified construction it will be noted that the spring 49ª is utilized to drive not only the film winding mechanism, but also the shutter snapping mechanism. The latch lever 71ª is provided with a fork 78 the arms of which engage against the opposite sides of the pinion 43 and are engaged by the cam block 79 on the pinion 43.

Should it be desired to mount the trip mechanism directly upon the box 10 a construction such as disclosed in Fig. 10 is resorted to wherein the spindle 34ᵇ extends up through the top of the box 10 a slight distance and is provided with a gear wheel 87. A sliding rack bar 24ᵇ is mounted upon the top of the box 10, intermeshes with the gear 87, and is provided with a trigger 25ᵇ, the trigger being pivoted upon the forward end of the rack bar 24ᵇ and adapted to be turned up for engagement with the finger or down against the top of the box 10 when out of use. The rack bar 24ᵇ is yieldingly held in normal position as shown in Fig. 10, by a spring 88 arranged upon the box 10. The rack bar 24ᵇ is drawn outwardly against the tension of the spring 88, turning the pinion 87 and spindle 34ᵇ, to actuate the camera mechanism. A suitable housing or casing 89 incloses these members, except the trigger 25ᵇ, and is carried upon the top of the box 10.

With the device as disclosed in Fig. 10 a very simple and compact camera is had wherein the shutter and film may be operated in proper sequence by simply pulling the trigger 25ᵇ outwardly from the casing 89. It is not necessary to provide the camera mechanism in Fig. 10 with a handle and a hinged or flexible connection to effect this double operation since the rack bar effects the proper movement and is mounted directly in the camera box 10.

Figure 16:
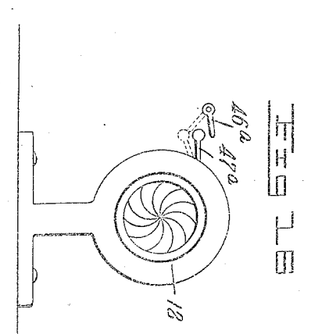
Fig. 16 is a plan view of a shutter showing a slight modification in the form of operating or snapping arms for use in connection with this camera mechanism.

In Fig. 16 of the drawings is disclosed a slight modification in the form of shutter actuating means, the same comprising a shutter snapping arm 47ª in the shutter 12, having a ball or smooth enlargement on its outer end which is struck by the end of a smooth arm 46ª operable by the pinion 43 to deflect the arm 47ª and operate the shutter 12. This form may be substituted when it is desired to eliminate the segmental teeth of the arms 46 and 47 of the preferred forms.

What I claim is,—

1. The combination of a film camera having a shutter snapping mechanism and a film actuating mechanism, with a spindle journaled in the camera and associated with said mechanisms, a detachable handle for supporting said camera, and actuating means mounted upon the handle whereby to set said spindle in motion.

2. In a camera, and in combination, a camera box, a socket sleeve upon the top of the box, a neck detachably fitting in said socket sleeve, a handle hinged upon the upper end of said neck, operating mechanism within the box including a spindle projecting up through said socket sleeve, and operating means arranged in the handle and having detachable connection with said spindle.

3. In a camera, and in combination, a camera box, operating mechanism in said box, a socket on the top of the box, a spindle associated with said mechanism and extending up into said socket, a detachable neck fitting in the socket, a hand grasp hinged upon the neck, operating means carried by the hand grasp, and a detachable connection between said spindle and said operating means.

4. In a camera, and in combination, a camera box, operating mechanism in said box, a spindle in said box projecting up through the same, a detachable handle horizontally mounted upon the top of said box, and operating means for said mechanism carried by said handle and having detachable connection with said spindle.

5. A camera comprising a box, shutter snapping mechanism carried by the box, shifting mechanism for a sensitized medium within the box, a spindle in said box, and intermittent and independent connecting means between said spindle and said shutter snapping and said sensitized medium operating mechanisms.

6. A camera comprising a box, a pair of connected spindles in said box, operating means connected with one of said spindles whereby to rotate both of said spindles, shutter snapping mechanism carried by the box and having connection with one of said spindles whereby the mechanism is intermittently operated, film shifting means in the box having connection with said spindle whereby said film shifting means is intermittently operated, and an interlock between said film shifting means and said shutter snapping mechanism controllable by the latter whereby to hold said film shifting means inoperative during the operation of said snapping mechanism.

7. A camera comprising a box, a pair of spindles in said box, a shutter operating pinion mounted in the box and having connection with the shutter of the camera, operating means meshing with said pinion normally urging the same for movement in one direction, an escapement on one of said spindles engaging said pinion whereby to normally hold the same inoperative, a sensitized film operating means connected with said spindle and including an arm on said spindle, and a pair of spaced stops operable by said arm and being spaced apart whereby to effect a lost motion between said escapement and said film operating means.

8. A camera comprising a box, a spindle in said box, shutter snapping mechanism in said box, operating means for said shutter snapping means normally urging the same for operation, an escapement on said spindle engaging said mechanism whereby to normally hold the same inoperative, film shifting means in the box, and operating mechanism for the film shifting means and having connection with said spindle whereby to operate said film mechanism subsequent to the operation of the escapement, and an interlock between said shutter snapping mechanism and said film operating mechanism.

9. A camera comprising a box, a reciprocating spindle shutter snapping means in the box including a spring, an arm on said spindle engaging said snapping means whereby to wind said spring upon the movement of said spindle in one direction, an escapement on said spindle engaging said snapping means adapted to hold said spring wound upon the reverse movement of said spring, film shifting mechanism in said box having connection with said spindle whereby to shift said film, and means carried by the box and having connection with said spindle whereby to reciprocate the spindle.

10. A camera comprising a box, an operating mechanism in the box, hand controlled means on the box having connection with said operating mechanism whereby to set the same in motion, shutter snapping means carried by the box and having connection with said mechanism whereby to intermittently actuate said shutter snapping means, and film winding mechanism in the box having connection with said first mechanism whereby to intermittently actuate said film winding mechanism subsequently to the operation of said shutter snapping mechanism.

11. A camera comprising a box, a spindle in said box, hand engaging means carried by the box having attachment to said spindle whereby to operate the same, a second spindle in said box having connection with said first spindle whereby said second spindle may be actuated, shutter snapping means associated with said second spindle and adapted for intermittent operation, a film spool shaft in said box and means interposed between said spindle and said film spool shaft whereby to rotate the latter subsequently to the movement of said shutter snapping device.

12. In a camera, and in combination, shutter snapping mechanism, a pinion associated with said mechanism whereby to actuate the same, a cam block on said pinion, means for operating said pinion, a film roll shaft, a ratchet on said shaft, means for intermittently rotating said shaft, and a latch lever having a fork end the arms of which engage about the opposite sides of the pinion and are adapted for engagement with said cam block, said latch lever having an outstanding tooth adapted for engagement with said ratchet whereby to normally lock said shaft from turning, said cam block being adapted for engagement with the upper arm of said fork whereby to lift said tooth from said ratchet and free said shaft.

13. A camera comprising a box, film winding means in the box including a shaft with a ratchet, shutter snapping means in the box provided with a pinion having a cam block on one side, and an interlocking latch lever in the box normally engaging said ratchet whereby to hold the intermittent winding means inoperative and having a portion adapted for engagement with said cam block whereby to move said latch lever out of engagement with said ratchet to release said film winding means.

14. In a camera and in combination, a box, shutter snapping means in the box including a pinion having a cam block on one side, film rolling means in the box including a shaft having a ratchet, a latch lever in the box having a finger projecting into engagement with said ratchet, and a spring in the box engaging said latch lever whereby to normally hold said finger against said ratchet, said latch lever having a portion adapted for engagement with said cam block whereby to move said finger from engagement with said ratchet against the tension of said spring.

In witness whereof, I subscribe my signature, in the presence of two witnesses.

JOHN N. JOHNSON.

Witnesses:
 C. P. HEATON,
 R. E. HOPPEL.